(12) United States Patent
Farajidana et al.

(10) Patent No.: US 8,837,649 B2
(45) Date of Patent: Sep. 16, 2014

(54) NON-PRIMARY PILOT CHANNEL DISCOVERY FOR INTERFERENCE CANCELLATION

(75) Inventors: Amir Farajidana, Sunnyvale, CA (US); Aditya Dua, Santa Clara, CA (US); Abhinav Gupta, San Jose, CA (US); Subramanya Padubidri Nanyam Rao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 13/533,401

(22) Filed: Jun. 26, 2012

(65) Prior Publication Data

US 2013/0343497 A1    Dec. 26, 2013

(51) Int. Cl.
*H04L 25/08* (2006.01)
*H04W 48/16* (2009.01)
*H04B 1/10* (2006.01)

(52) U.S. Cl.
CPC *H04B 1/10* (2013.01); *H04W 48/16* (2013.01)
USPC ..................................................... 375/346

(58) Field of Classification Search
USPC ......... 375/346, 130, 148, 267, 295, 347, 349; 370/335; 455/442, 522
See application file for complete search history.

(56) References Cited

U.S. PATENT DOCUMENTS

| 2003/0095516 | A1 | 5/2003 | Ok et al. | |
|---|---|---|---|---|
| 2005/0090261 | A1* | 4/2005 | Agin | 455/442 |
| 2005/0180364 | A1* | 8/2005 | Nagarajan et al. | 370/335 |
| 2011/0002283 | A1 | 1/2011 | Drugge et al. | |
| 2011/0038407 | A1 | 2/2011 | Ki et al. | |
| 2011/0116563 | A1 | 5/2011 | Vitthaladevuni et al. | |
| 2011/0261711 | A1 | 10/2011 | Kronestedt et al. | |
| 2012/0027052 | A1 | 2/2012 | Botha et al. | |
| 2013/0148699 | A1* | 6/2013 | Reial | 375/148 |

FOREIGN PATENT DOCUMENTS

| EP | 1507427 A1 | 2/2005 |
|---|---|---|
| WO | 9913605 | 3/1999 |

OTHER PUBLICATIONS

3GPP TS 25.211 "Physical channels and mapping of transport channels onto physical channels (FDD)", Version 9.0.0, Release 9, Sep. 2009, pp. 1-56.
3GPP TS 25.331, "Radio Resource Control (RRC); Protocol specification", Version 9.0.0, Release 9, Sep. 2009, pp. 1-1710.
International Search Report and Written Opinion—PCT/US2013/047426—ISA/EPO—Feb. 21, 2014.

* cited by examiner

*Primary Examiner* — Khai Tran
(74) *Attorney, Agent, or Firm* — Darren M. Simon

(57) ABSTRACT

Methods and apparatus are described for processing a signal in a communication system. A signal may be received a user equipment, and a pilot transmission from a non-primary transmit antenna of a cell in the communication system may be detected in the signal based on metrics associated with a pilot channel. Information about the pilot channel is not signaled to the user equipment. The detected pilot transmission is used to improve receiver processing of the signal.

38 Claims, 13 Drawing Sheets

NON-PRIMARY PILOT CHANNEL DISCOVERY FOR INTERFERENCE CANCELLATION

BACKGROUND

1. Field

Aspects of the present disclosure relate generally to wireless communication systems, and more particularly, to managing interference from non-primary pilot channels.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In accordance with some aspects, a method of processing a signal in a communication system is described herein that includes receiving a signal at a user equipment (UE) and detecting, in the signal, a pilot transmission from a non-primary transmit antenna of a cell in the communication system based on one or more metrics associated with a pilot channel. Information about the pilot channel is not signal to the UE. The method also includes using the detected pilot transmission to improve receiver processing of the signal.

In accordance with some aspects, a computer program product is described herein. The computer program product may include at least one instruction for causing a computer to receive a signal at a UE. The computer program product may also include at least one instruction for causing the computer to detect, in the signal a pilot transmission from a non-primary transmit antenna of a cell in the communication system based on one or more metrics associated with a pilot channel, wherein the information about the pilot channel is not signaled to the UE. In addition, the computer program product may include at least one instruction for causing the computer to use the detected pilot transmission to improve receiver processing of the signal.

In accordance with some aspects, an apparatus is described herein that includes means for receiving a signal at a UE and means for detecting, in the signal, a pilot transmission from a non-primary transmit antenna of a cell in the communication system based on one or more metrics associated with a pilot channel, wherein the information about the pilot channel is not signaled to the UE. The apparatus may also include means for using the detected pilot transmission to improve receiver processing of the signal.

In accordance with some aspects, an apparatus for processing a signal in a communications system is described herein. The apparatus may include at least one processor configured to receiver a signal at a UE, detect, in the signal, a pilot transmission from a non-primary transmit antenna of a cell in the communication system based on one or more metrics associated with a pilot channel, wherein information about the pilot channel is not signaled to the UE, and use the detected pilot transmission to improve receiver processing of the signal, The apparatus may also include a memory coupled to the at least one processor.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
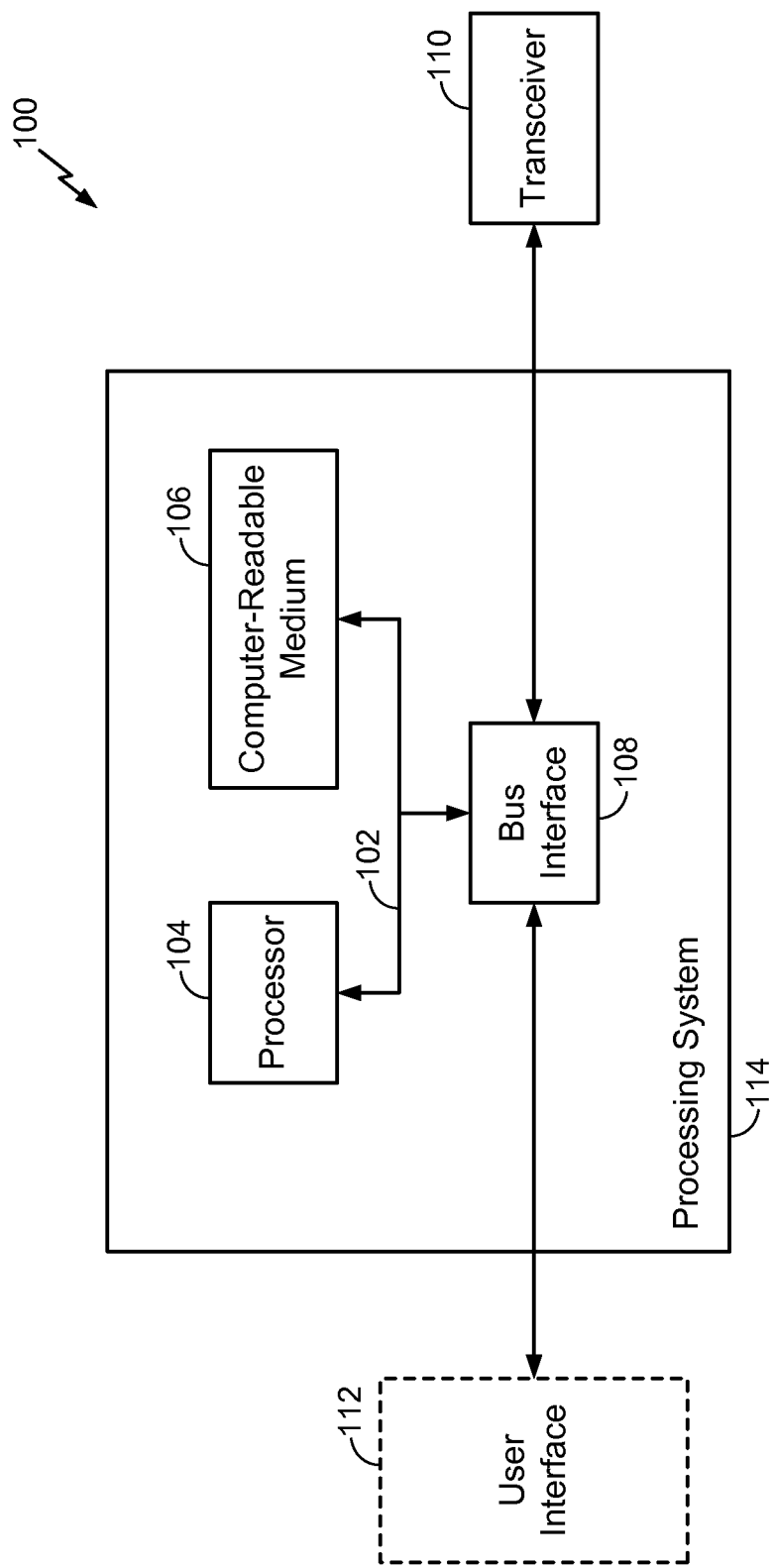
FIG. 1 is a block diagram illustrating an example of a hardware implementation for an apparatus employing a processing system.

FIG. 1 is a block diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
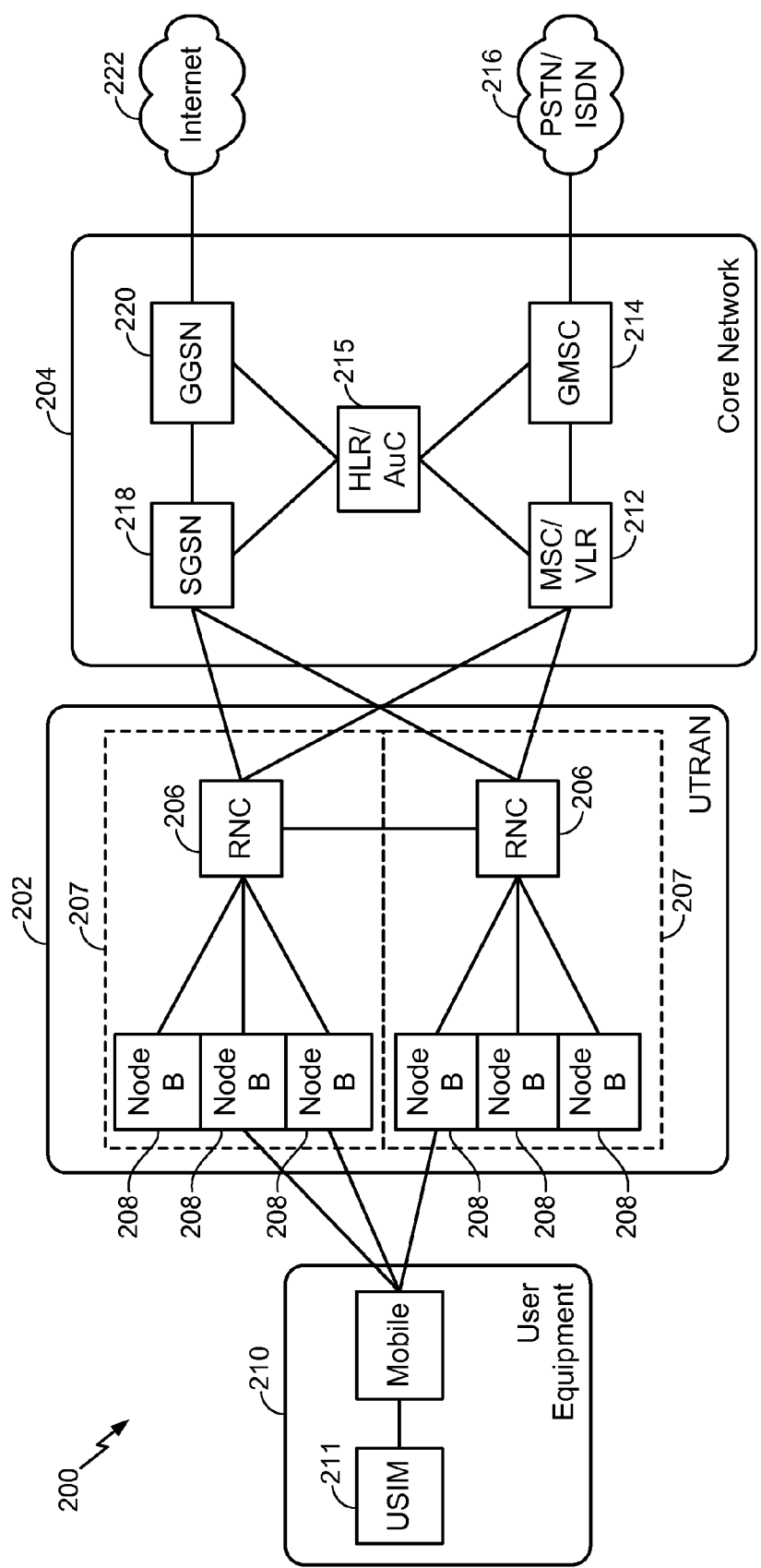
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes multiple input multiple output (MIMO) and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 3:
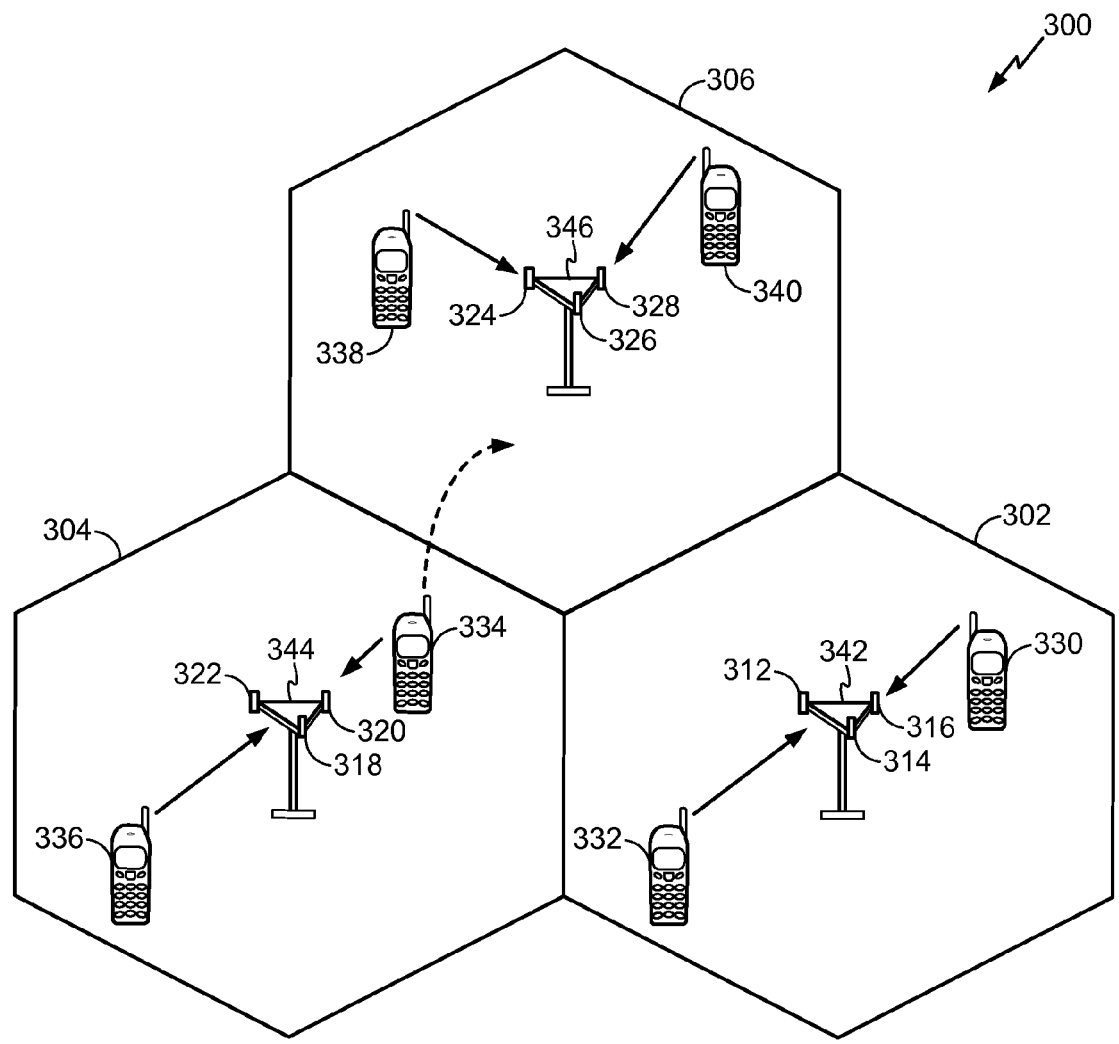
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 4.

Figure 4:
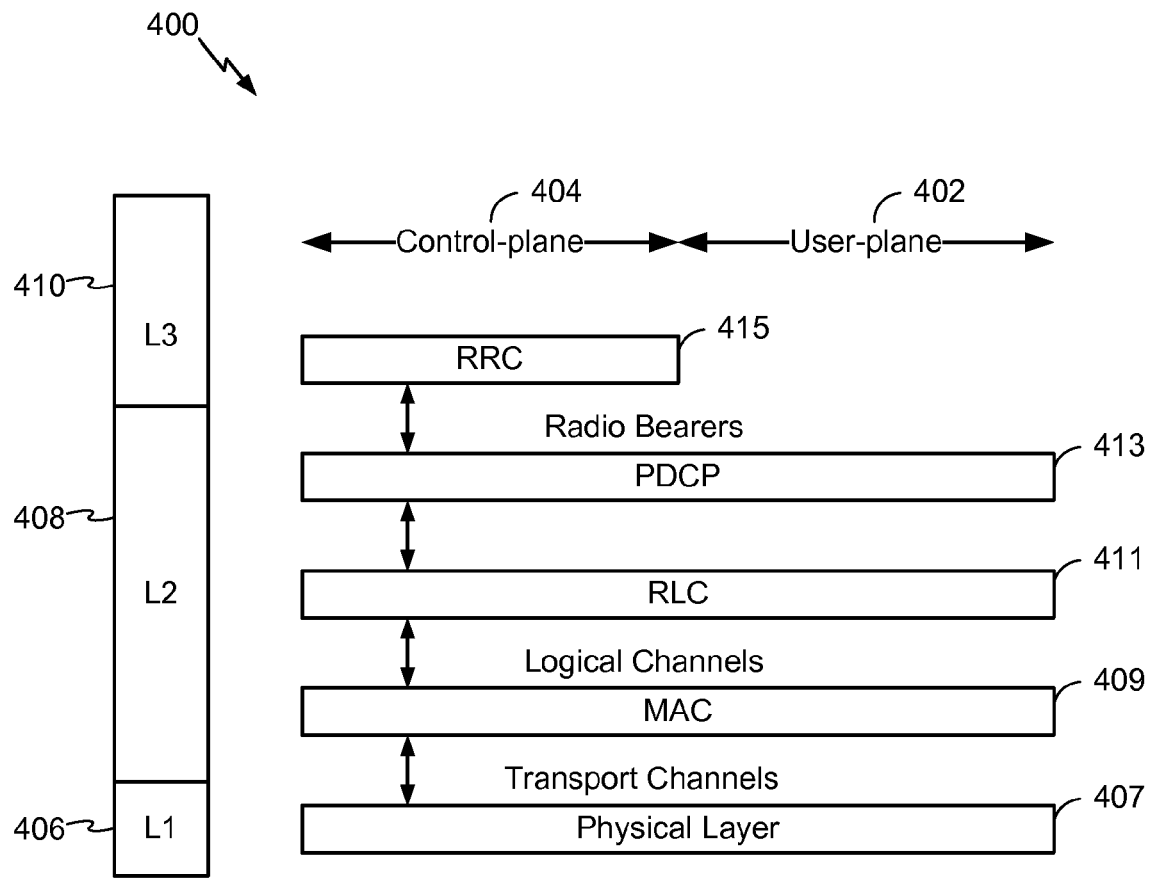
FIG. 4 is a conceptual diagram illustrating an example of a radio protocol architecture for the user and control plane.

Referring to FIG. 4 an example radio protocol architecture 400 relates to the user plane 402 and the control plane 404 of a user equipment (UE) or node B/base station. For example, architecture 400 may be included in a UE. The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 5:
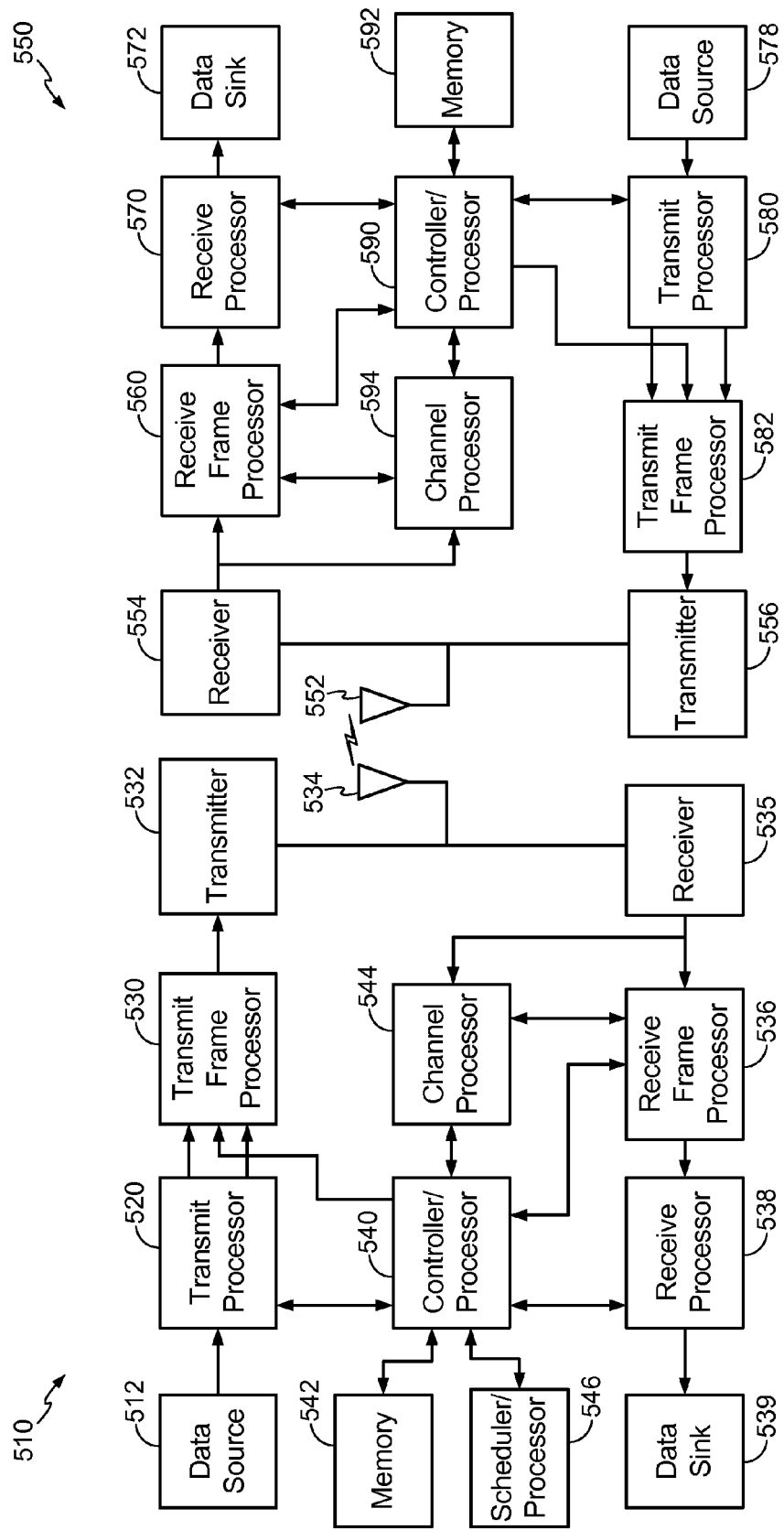
FIG. 5 is a block diagram conceptually illustrating an example of a Node B in communication with a UE in a telecommunications system.

FIG. 5 is a block diagram of a Node B 510 in communication with a UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 6:
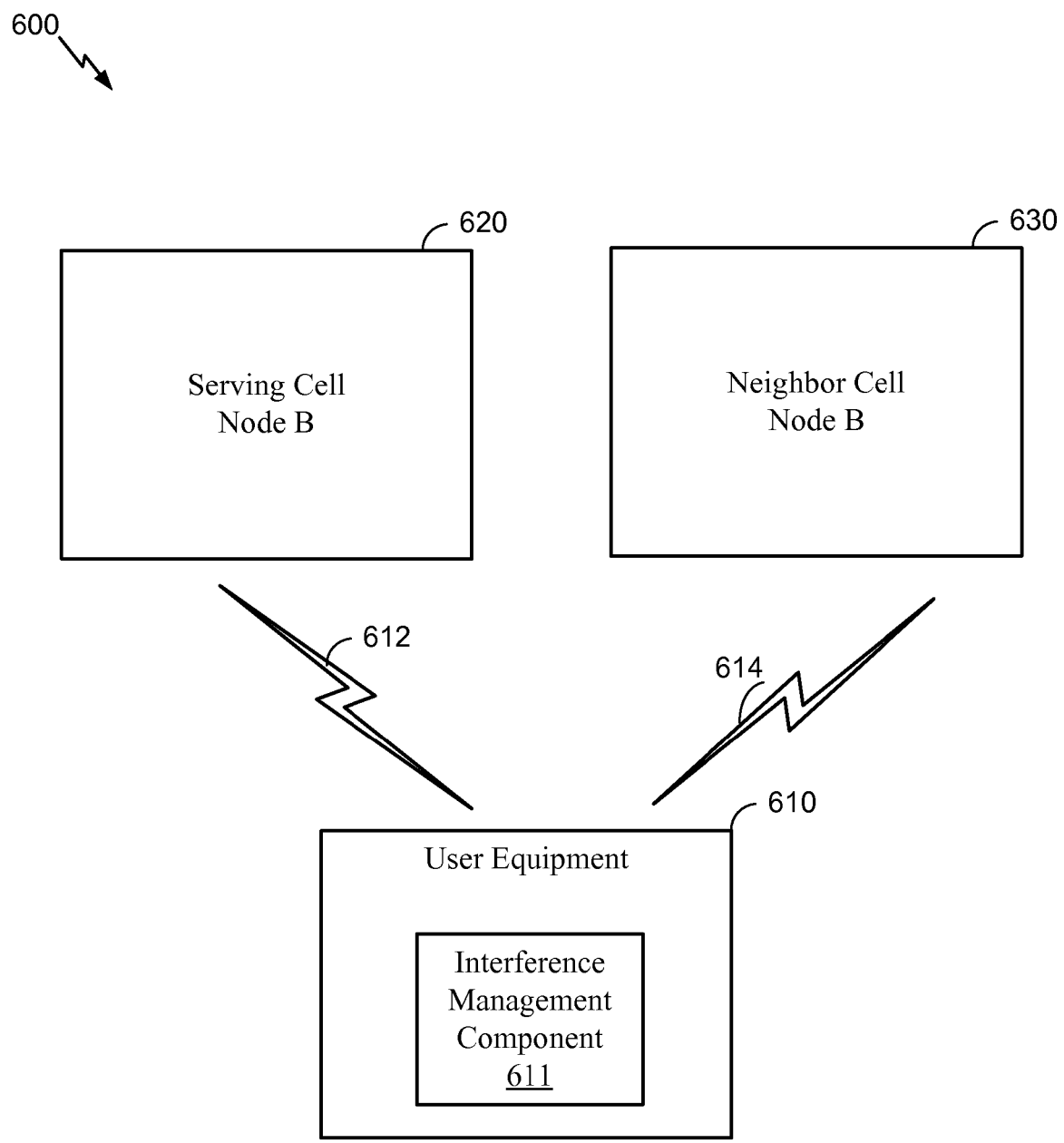
FIG. 6 is one example of a wireless communications system, in accordance with various disclosed aspects.

FIG. 6 depicts an example wireless communications system 600, which may facilitate communication between a user equipment (UE) 610 and one or more Node Bs, such as serving cell Node B 620 and Neighbor Cell Node B 630. In an aspect of the present disclosure, serving cell Node B 620 may directly serve UE 610 by communicating data and control signals directly to UE 610 over a communication link 612. Communication link 612 may include an uplink (UL) channel, which may carry communications to serving cell Node B 620 originating at UE 610, and a downlink (DL) channel, which may carry communications to UE 610 from serving cell Node B 620. Serving cell Node B 620 may provide data and/or control signaling to UE 610 on the DL and receive UL data or feedback from UE 610 where the UE 610 is currently camped on and/or located in a serving cell governed by serving cell Node B 620. The current serving cell may include one or more neighbor cells, one of which may be neighbor cell Node B 630. Furthermore, neighbor cell Node B 630 may be in the active set of UE 610, but may not currently be the serving cell Node B to UE 610. Nonetheless, neighbor cell Node B 630 may provide control information to UE 610 via communication link 614.

In accordance with some aspects, due to the proximity of neighbor cell Node B 630 to UE 110 when neighbor cell Node B 630 is not operating as serving cell for the UE, UE 110 may also receive interference signals from neighbor cell Node B 630. For example, in some aspects, neighbor cell Node B 630 may be capable of providing transmit diversity to space time transmit diversity (STTD) or MIMO UEs by transmitting on two or more antennas. When a MIMO call, for example, is being serviced by neighbor cell Node B 630, interference may be received at UE 610 from both a primary channel and a secondary channel associated with neighbor cell Node B 630. For example, the primary channel may be a Primary Common Pilot Channel (P-CPICH) and the secondary channel a Secondary Common Primary Channel (S-CPICH). However, UE 610 may not receive signaling for the secondary channel. Interference management component 611 may be configured to detect a pilot transmission from a non-primary transmit antenna, and may use the detected pilot transmission to improve receiver processing, for example, by performing interference cancellation, equalization, and/or suppression for signals received from the secondary channel.

For example, the functions of interference management component 611 described herein may be carried out or include, for example, processing system 114, processor 104, and/or computer-readable medium 106. Furthermore, in an aspect, serving cell Node B 620 and/or neighbor cell Node B 630 may be Node B 510 of FIG. 5, Node Bs 346, 342, and/or 344 of FIG. 3, and/or Node B 208 of FIG. 2, and UE 610 may be UE 550 of FIG. 5, UEs 330, 332, 334, 336, 338, 340 of FIG. 3, and/or UE 210 in FIG. 2, any of which may be configured to perform the interference management functionality described herein.

Figure 7:
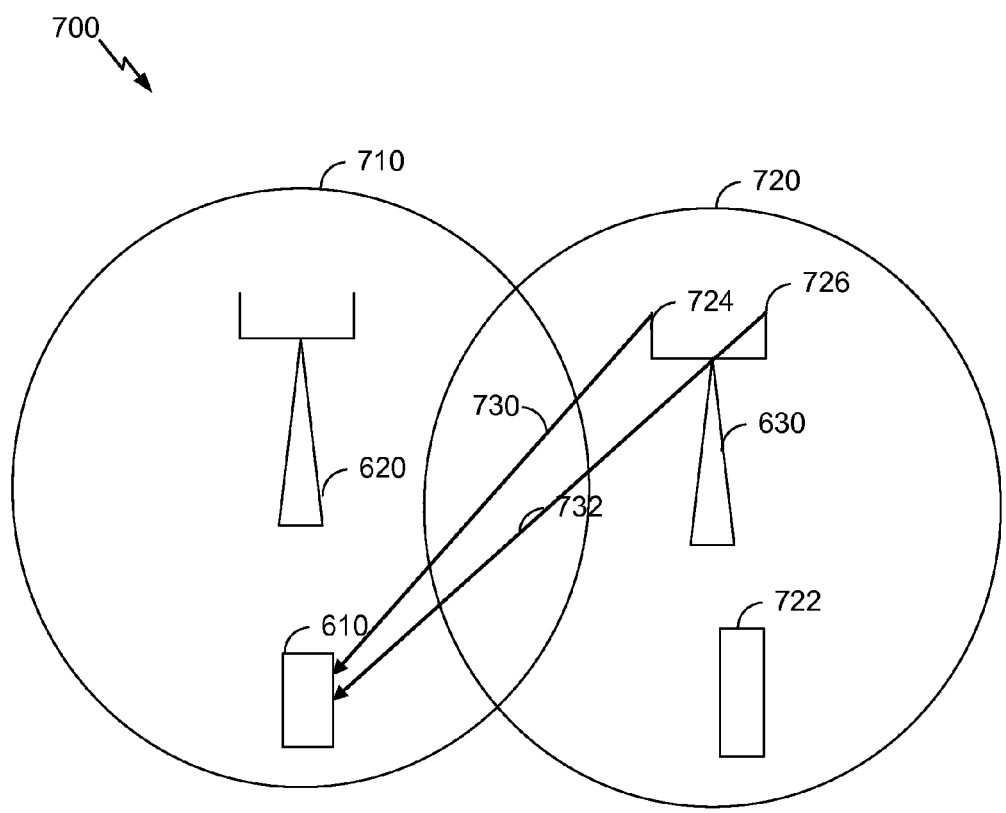
FIG. 7 is an example of a wireless communications system, in accordance with various disclosed aspects.

FIG. 7 depicts an example communication system 700 wherein inter-cell interference from a secondary transmit channel on a non-serving Node B, such as a S-CPICH, is received at a UE. UE 610 may be located within a first cell 710, and may be communicatively connected to serving cell Node B 620. A UE 722 may be in an active MIMO call within a second cell 720, wherein neighboring cell Node B 630 is transmitting data via a first antenna 724 and a second antenna 726. As shown at 730, 732 signals transmitted by first antenna 724 and second antenna 726 may be received at UE 610 as interference signals. In some aspects, UE 610 may not be configured for MIMO. As such, second cell 720 may only provide signaling related to a first transmit channel on neighbor cell Node B 630. UE 610 may be configured to detect pilot transmissions from the secondary transmit channel on neighbor cell Node B 630, and use the detected transmissions to perform interference management.

Figure 8:
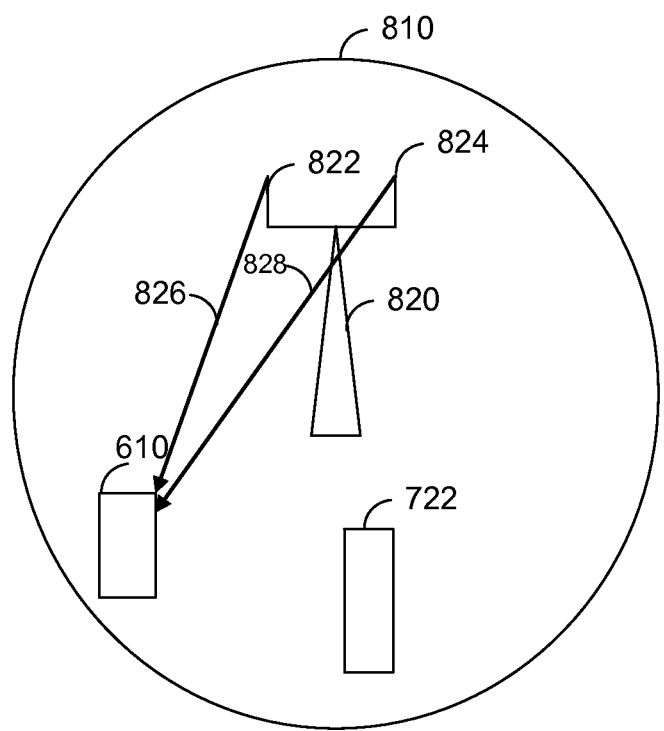
FIG. 8 is another example of a wireless communications system, in accordance with various disclosed aspects.

The interference management techniques described herein may also be used to detect and remove intra-cell interference. As shown in FIG. 8, UE 610 and UE 722 are both located in a first cell 810. UE 722 may be in an active MIMO call, wherein Node B 820 is transmitting data via a first antenna 822 and a second antenna 824. As shown at 826, 828, signals transmitted by first antenna 822 and second antenna 824 may be received at UE 610 as interference signals. Again, UE 610 does not receive signaling for data transmitted via the second antenna 924. In some aspects, UE 610 may be configured to detect pilot transmission from second antenna 824, and use the detected transmissions to perform interference management.

Figure 9:
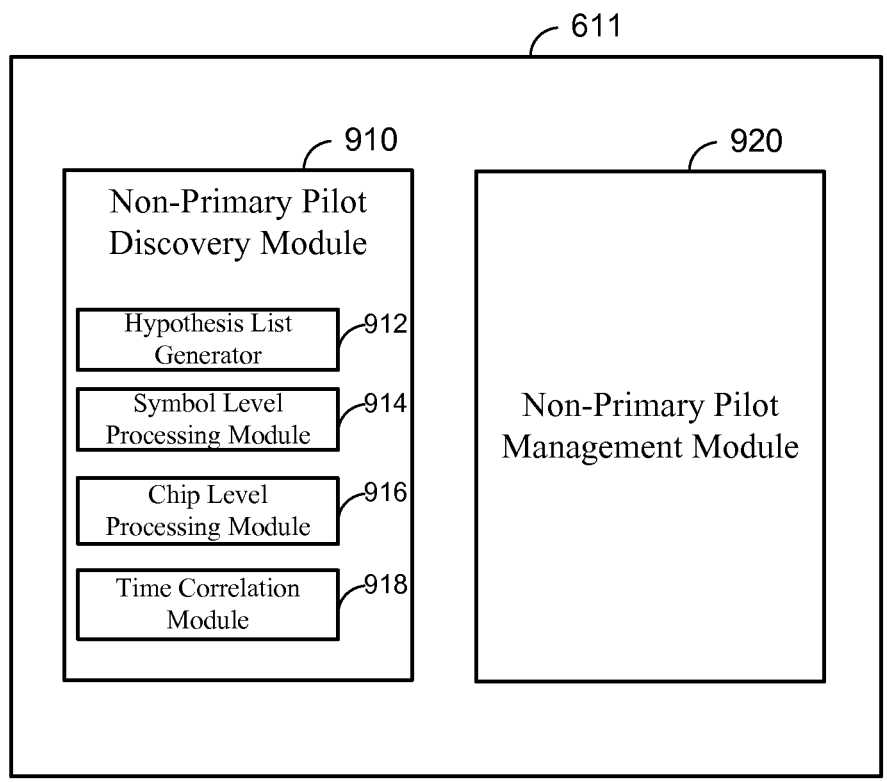
FIG. 9 is a block diagram conceptually illustrating an example of an interference management component.

Referring now to FIG. 9, interference management component 611 is depicted in greater detail. Interference management component 611 may include a non-primary pilot discovery module 910 and a non-primary pilot management module 920. Non-primary pilot discovery module 910 may be configured to discover and characterize an interfering pilot signal. The interfering pilot signal may be received at a UE as a result of inter-cell or intra-cell interference.

Non-primary pilot discovery module 910 may include a hypothesis list generator 912 configured to reduce the search space of possible codes associated with the interferer. In the case of interference from S-CPICH, for example, though the S-CPICH channelization code can be chosen arbitrarily among the SF-256 codes, in accordance with some aspects, hypothesis list generator 912 may be configured to limit the search space for S-CPICH discovery to a smaller list of codes based on information available regarding S-CPICH. By reducing the search space, the complexity of the discovery algorithm as well as the performance may be improved. In some aspects, a hypothesis list may be generated and sorted based on the likelihood of each code being the S-CPICH code.

In accordance with some aspects, hypothesis list generator 912 may be configured to remove known occupied codes on an OVSF tree of a cell of interest. For example, a UE may be aware of codes associated with P-CPICH, primary common control physical channel (PCCPCH), etc. These known codes may be removed from the list of possible codes associated with the interferer. In some aspects, hypothesis list generator 912 may be configured to limit S-CPICH code discovery to the first one or two SF-16 OVSF codes. Given the contiguous assignment constraints of the high speed-physical downlink shared channel (HS-PDSCH) code allocation, the S-CPICH OSVF codes are likely to be located within the first two SF-16 OVSF codes. Hypothesis list generator 912 may also be configured to give higher priority to OVSF codes previously used for S-CPICH transmission during a MIMO call in the cell of interest or a neighboring cell. For example, an S-CPICH OVSF code on a serving cell may be used for determining the presence of S-CPICH transmission in interfering cells. Additionally, an S-CPICH OVSF code previously assigned during a MIMO call within a cell of interest may be used.

In accordance with some aspects, hypothesis list generator 912 may be configured to use information/metrics already available and computed in the receiver algorithm to prune the search space. For example, hypothesis list generator 912 may be configured to use symbol amplitude, power, signal-noise ratio (SNR) estimates, etc., for the primary transmit antenna obtained during symbol processing to reduce the search space.

Using the hypothesis list generated by hypothesis list generator 912, non-primary pilot discovery module 910 may be configured to determine an interfering code using one or more methods. For example, a symbol level processing module 914 may be configured to test the codes in the hypothesis list. Symbol level processing module 914 may be configured to use known properties of the interfering channel to determine the appropriate code. For example, where the channel is an S-CPICH, symbol level processing module 914 may be use knowledge of the fact that S-CPICH is always transmitted on an SF256 code, the S-CPICH bit sequence is always one, S-CPICH is only transmitted from a secondary antenna, S-CPICH can be used as a phase reference for MIMO HSDPA transmission, the transmit offset power between P-CPICH and S-CPICH, and/or other channel properties.

Non-primary pilot discovery module 910 may also include a chip level processing module 916. Chip level processing module 916 may be configured to estimate the channel impulse response (CIR) for each S-CPICH hypothesis in the hypothesis list. The CIR estimate may be obtained, for example, using existing hardware/software available at the UE. A CIR vector may be generated for each hypothesis, and the vector may be further filtered/processed for accuracy.

Non-primary pilot discovery module 910 may also include a time correlation module 919, which may be used separately or along with the symbol level processing module 914 or chip level processing module 916 to determine the interfering code. CIR taps across different 256 chip blocks may be time correlated. Time correlation may be particularly useful for lower speeds when the channel taps are likely to have a high correlation in time. In some aspects, time correlation can be computed as follows:

$$C_i(n) = \frac{|p_i(n) \cdot p_i(n+1)^*|}{\|p_i(n)\|^a \cdot \|p_i(n+1)\|^b}$$

where a and b are positive constants.

Interference management component 611 may also include interference management module 920. In the case of S-CPICH, the S-CPICH OVSF code is defined per MIMO HS call, and may be present only for the duration of the call. Moreover, if multiple MIMO calls with S-CPICH are occurring, multiple S-CPICH candidates may be detected. Interference management module 920 may be configured to manage the S-CPICH OVSF previously used by blocks such as equalization and interference cancellation as part of the receiver algorithm. The interference management module 920 can used the metrics described herein to manage the set of OVSF codes for S-CPICH channels across cells. In some aspects, interference management module 920 may be configured to maintain a ranked list of S-CPICH codes discovered across cells. In some aspects, interference management module 920 may be configured to multiplex the hardware and/or software resources needed for S-CPICH set discovery and management with other existing tasks using those resources. The interference management module 920 may use hysteresis in adding or dropping S-CPICH OVSF codes from the detected set.

Figure 10:
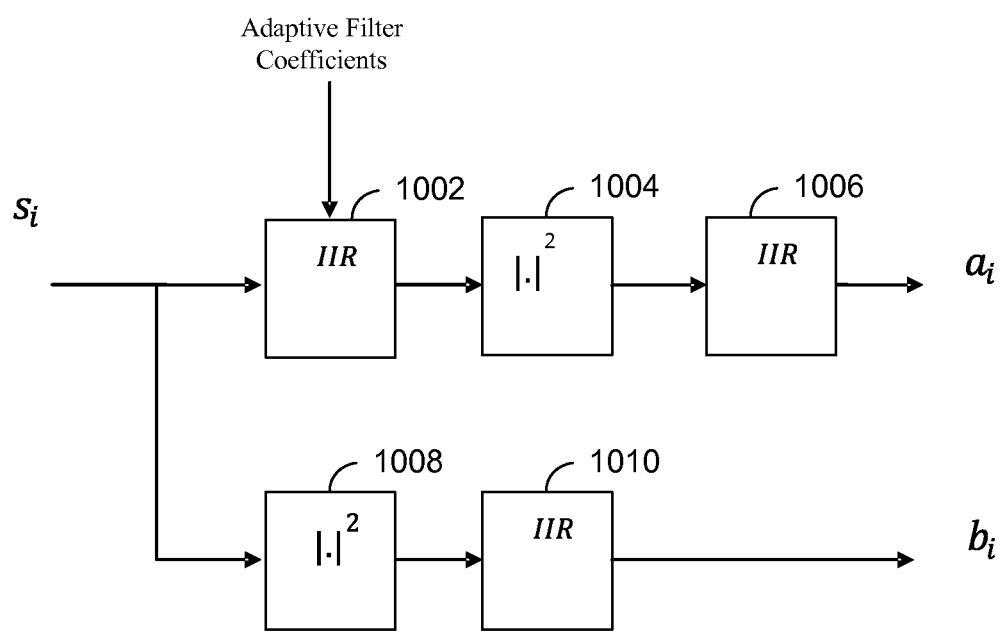
FIG. 10 is a block diagram conceptually illustrating an example of symbol level pilot channel discovery.

Referring now to FIG. 10, an example of symbol level S-CPICH discovery is shown. An estimated symbol, $S_i$, for the i-th hypothesis of S-CPICH OVSF code may be generated by dispreading the chip level signal. The estimated symbol is first averaged over a number of symbol periods, as shown at 1002. The averaging period may be a function of the UE speed, estimated directly via sensors or indirectly via signal processing algorithms. The norm squared of the average symbol may be determined, as shown at 1004, and passed through an IIR filter to compute a first metric $a_i$, as shown at 1006. This first averaging of the symbol may make use of the fact that the same bit/symbol sequence is always transmitted on the S-CPICH channel.

Simultaneously, the average energy of the symbol may be computed by taking the norm squared of the symbol, as shown at 1008, and passing the norm squared through an IIR filter, as shown at 1010, to compute a second metric $b_i$. By averaging the signal before looking at the norm of it, signals with non-constant values over time will result in low values of $a_i$, even if these symbols can have high values of $b_i$. The $a_i$ and $b_i$ metrics for all possible hypotheses may be used in discovering the interfering S-CPICH. While IIR filters are shown in FIG. 10, this is only an example. Other filtering structures, such as FIR can also be used to compute the metrics.

In accordance with some aspects, in deciding the presence of S-CPICH and the corresponding OVSF code, the absolute values of $a_i$ and $b_i$ may be considered, in addition to their ratios. For example, values of $a_i$ and $b_i$ may be compared to a first threshold. The first threshold may be dependent on the P-CPICH Ec/Io, and may be based on maximum power offset between S-CPICH and P-CPICH. The ratio of $a_i$ to $b_i$ may be compared to a second threshold. In accordance with some aspects, a S-CPICH code from the candidate list may be correspond to the interferer if the values of $a_i$ and $b_i$ each exceed the first threshold, and if the ratio of $a_i$ to $b_i$ exceeds the second threshold. In some aspects, if more than one OVSF code in the hypothesis list satisfies these conditions, the UE may select a code based on different metrics. For example, the UE may select the candidate with the highest $a_i$ and/or $b_i$. In some aspects, the UE may use the CIR corresponding to some or all of the candidate S-CPICH OVSF codes for suppressing or cancelling interference.

Figure 11:
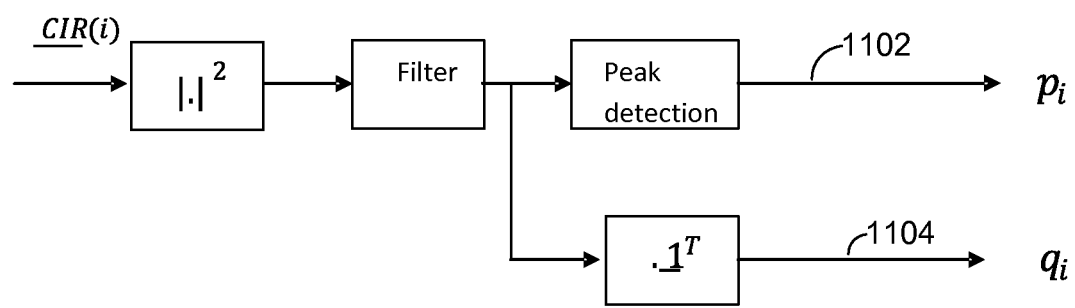
FIG. 11 is a block diagram conceptually illustrating an example of chip level pilot channel discovery.

FIG. 11 depicts an example of chip level processing for S-CPICH discovery. An empirical power delay profile (PDP) of an estimated channel response is used. For example, for common channel propagations, it is expected that the PDP of the channel will be sparse, and the energy of the channel will be limited to a small number of taps. Using this knowledge, the decision metric for OVSF code hypothesis i can be based on the energy of the peak CIR, $p_i$, computed as shown at 1102, on the ratio of peak to total energy of filtered CIRs, $q_i$, computed as shown at 1104, or on both. In some aspects, if the peak energy, $p_i$ exceeds a first threshold, if the ratio, $q_i$, exceeds a threshold, or if both conditions are met, the OVSF hypothesis under test may correspond to an S-CPICH transmission. In some aspects, each OVSF hypothesis in the hypothesis list can be tested in a round-robin fashion to collect decision metrics for all candidate codes.

Figure 12:
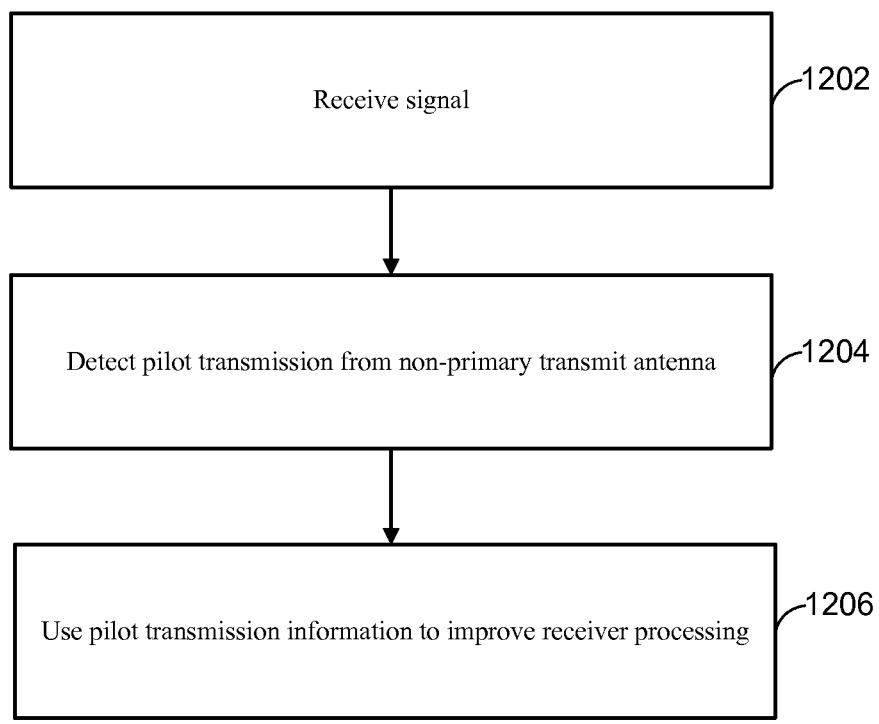
FIG. 12 is a flow chart illustrating an example of a method for pilot channel discovery.

FIG. 12 depicts a method 1200 of processing a signal in a communication system. In accordance with some aspects, the method 1200 may be performed by a UE, such as UE 610 or UE 722 depicted in FIGS. 6 and 7. As shown at 1202, the UE may receive a signal. The signal may be, for example, an interference signal resulting from inter-cell interference or intra-cell interference. For example, the interference signal may result from a MIMO call occurring between a base station and another UE.

As shown at 1204, the UE may detect a pilot transmission from a non-primary transmit antenna in the signal. The detected pilot transmission may be from a non-primary transmit antenna of a serving cell of the UE, or of a neighbor cell adjacent to the serving cell. The pilot transmission may be detected based on one or more metrics associated with a pilot channel. In accordance with some aspects, the pilot channel is not broadcast throughout the communication system. In detecting the pilot transmission, the UE may reduce a search space used to discover the pilot to a hypothesis list of a first set of pilot channelization codes that is less than all possible channelization codes based on known channel properties. As shown at 1206, the UE may use the detected pilot transmission to improve receiver processing of the signal. For example, the UE may suppress, equalize, cancel, etc. interference in the signal caused by the detected pilot transmission. In some aspects, the detected pilot transmission may be an S-CPICH transmission on an S-CPICH channel.

Figure 13:
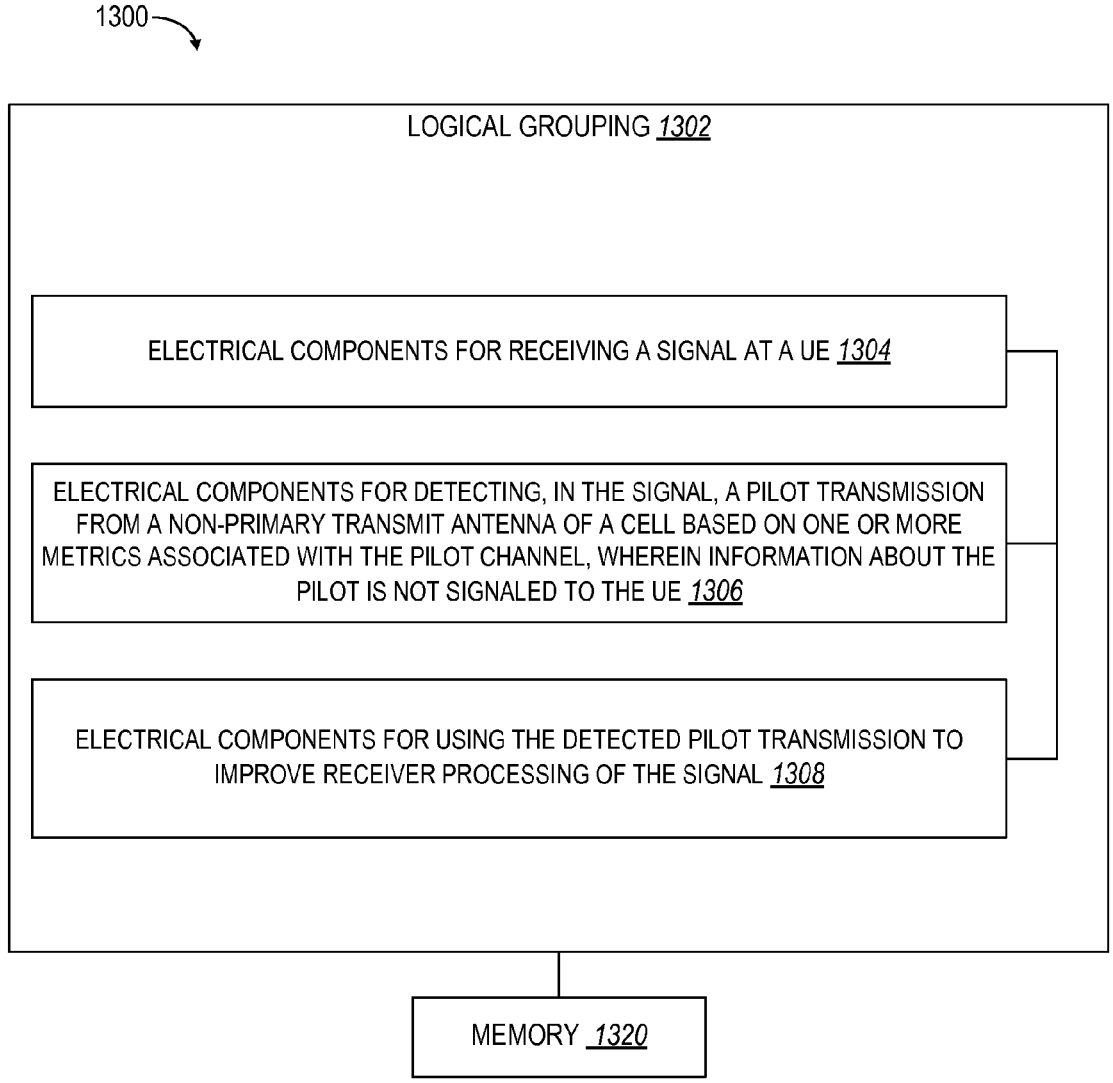
FIG. 13 depicts an apparatus for processing a signal, in accordance with various disclosed aspects.

With reference to FIG. 13, illustrated is a system 1300 for wireless communication. For example, system 1300 can reside at least partially within user equipment, such as UE 610. It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component 1304 for receiving a signal at a user equipment (UE). In some aspects, electrical component 1304 may be implemented by transceiver 110 and/or processing system 114. Moreover, logical grouping 1302 can include an electrical component 1306 for detecting, in the signal, a pilot transmission from a non-primary transmit antenna of a cell in the communication system based on one or more metrics associated with a pilot channel, wherein information about the pilot channel is not signaled to the UE. In some aspects, the logical grouping 1302 may be implemented by non-primary pilot discovery module 910 and/or processing system 114. Logical grouping 1302 may also include an electrical component 1308 for using the detected pilot transmission to improve receiver processing of the signal. In some aspects, electrical component 1308 may be implemented by non-primary pilot discovery module 910, non-primary pilot management module 920, and/or processing system 114. Additionally, system 1300 can include a memory 1320 that retains instructions for executing functions associated with electrical components 1304-1308. While shown as being external to memory 1320, it is to be understood that one or more of electrical components 1304-1308 can exist within memory 1320.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of processing a signal in a communication system, comprising:
   receiving a signal at a user equipment (UE);
   detecting by the UE, in the signal, a pilot transmission from a non-primary transmit antenna of a cell in the communication system based on one or more metrics associated with a pilot channel, wherein information about the pilot channel is not signaled to the UE; and
   using the detected pilot transmission to improve receiver processing of the signal by the UE, wherein using the detected pilot transmission to improve receiver processing comprises at least one of suppressing, or equalizing, or cancelling interference in the signal caused by the detected pilot transmission.

2. The method of claim 1, wherein the cell is a serving cell of the UE or a neighbor cell adjacent to the serving cell.

3. The method of claim 1, wherein the pilot transmission is a secondary-common pilot channel (S-CPICH) transmission, and the pilot channel is an S-CPICH channel.

4. The method of claim 1, wherein using the detected pilot transmission to improve receiver processing further comprises estimating a channel corresponding to the non-primary transmit antenna associated with the pilot transmission and using the estimated channel to improve receiver processing.

5. The method of claim 1, wherein detecting the pilot transmission further comprises:
   reducing a search space used to discover the pilot transmission to a hypothesis list of a first set of pilot channelization codes that is less than a second set of all possible pilot channelization codes.

6. The method of claim 5, wherein the pilot transmission is an S-CPICH transmission, and wherein reducing the search space further comprises as least one of:
   removing known occupied orthogonal variable spreading factor (OVSF) codes, including OVSF codes used for primary CPICH or primary common control physical channel (PCCPCH) transmissions;
   limiting the first set to a first one or a first two spreading factor 16 codes of an OVSF code tree;
   identifying OVSF codes previously used for S-CPICH transmission in a serving cell of the UE or a neighbor cell adjacent to the serving cell; or
   discarding OVSF codes with larger than a threshold symbol gain estimate and/or signal-noise ratio (SNR).

7. The method of claim 1, wherein the pilot transmission is an S-CPICH transmission, and wherein detecting the pilot transmission further comprises:
   determining one or more symbol-based metrics based on symbol level estimates of hypothetical S-CPICH OVSF codes;
   comparing the one or more symbol-based metrics to a corresponding symbol metric threshold; and
   identifying the S-CPICH transmission based on the comparing.

8. The method of claim 7, wherein the one or more symbol-based metrics comprise at least one of an average-based symbol metric, $a_i$, a norm squared-based symbol metric, $b_i$, or an average/norm squared ratio metric, $a_i/b_i$, and wherein identifying the pilot transmission is based on satisfying conditions of the algorithm including $a_i$ and $b_i$ both being greater than a first threshold and the ratio of $a_i$ and $b_i$ being above a second threshold.

9. The method of claim 7, wherein the symbol-based metrics are combined over multiple estimation periods to improve the accuracy of detection and identifying the pilot transmission.

10. The method of claim 1, wherein the pilot transmission in an S-CPICH transmission, and wherein detecting the S-CPICH transmission further comprises:
   determining one or more chip-based metrics based on chip level estimates of hypothetical S-CPICH OVSF codes;
   comparing the one or more chip-based metrics to a corresponding chip metric threshold; and
   identifying the S-CPICH transmission based on the comparing.

11. The method of claim 10, wherein the one or more chip-based metrics comprise at least one of a peak energy-based chip metric, $p_i$, a total energy-based chip metric, $q_i$, a ratio metric, $p_i/q_i$, and wherein identifying the S-CPICH transmission is based on satisfying conditions of the algorithm including $p_i$ being greater than a first threshold and the ratio of $p_i$ and $q_i$ being above a second threshold.

12. The method of claim 11, wherein the peak energy-based chip metric, $p_i$, and the total energy-based chip metric, $q_i$, are based on an estimated channel impulse response (CIR) for each S-CPICH hypothesis.

13. The method of claim 10, wherein the chip-based metrics are combined over multiple estimation periods to improve the accuracy of detection and identifying the pilot transmission.

14. The method of claim 1, wherein the pilot transmission is an S-CPICH transmission, and wherein detecting the S-CPICH transmission further comprises:
   determining a time correlation-based metric corresponding to channel impulse response (CIR) taps;
   comparing the time correlation-based metric to a corresponding time correlation-based metric threshold; and
   identifying the pilot transmission based on the comparing.

15. The method of claim 14, wherein the time correlation-based metrics are combined over multiple estimation periods to improve the accuracy of detection and identifying the pilot transmission.

16. The method of any of claim 1, further comprising:
   creating a code management block to maintain a ranked list of pilot codes discovered across cells.

17. The method of claim 16, further comprising:
   multiplexing, based on the code management block, hardware and software resources needed for pilot code set discovery and management with other existing tasks using the hardware and software resources.

18. The method of claim 16, further comprising:
   applying a hysteresis before adding or dropping a pilot code from the ranked list of pilot codes.

19. A computer program product, comprising:
   at least one instruction for causing a computer to receive a signal at a user equipment (UE);
   at least one instruction for causing the computer to detect by the UE, in the signal, a pilot transmission from a non-primary transmit antenna of a cell in the communication system based on one or more metrics associated with a pilot channel, wherein information about the pilot channel is not signaled to the UE; and
   at least one instruction for causing the computer to use the detected pilot transmission to improve receiver processing of the signal by the UE, wherein the at least one instruction for causing the computer to use the detected pilot transmission to improve receiver processing of the signal comprises at least one instruction for performing at least one of suppressing, or equalizing, or cancelling interference in the signal caused by the detected pilot transmission.

20. An apparatus, comprising:
   means for receiving a signal at a user equipment (UE);
   means for detecting by the UE, in the signal, a pilot transmission from a non-primary transmit antenna of a cell in the communication system based on one or more metrics associated with a pilot channel, wherein information about the pilot channel is not signaled to the UE; and
   means for using the detected pilot transmission to improve receiver processing of the signal by the UE, wherein the means for using the detected pilot transmission to improve the receiver processing comprises means for performing at least one of suppressing, or equalizing, or cancelling interference in the signal caused by the detected pilot transmission.

21. An apparatus for processing a signal in a communications system, comprising:
   at least one processor configured to:
     receive a signal at a user equipment (UE);
     detect by the UE, in the signal, a pilot transmission from a non-primary transmit antenna of a cell in the communication system based on one or more metrics associated with a pilot channel, wherein information about the pilot channel is not signaled to the UE; and
     use the detected pilot transmission to improve receiver processing of the signal by the UE; and
   a memory coupled to the at least one processor, wherein the at least one processor is further configured to use the detected pilot transmission to improve the receiver processing comprising at least one of suppressing, or equalizing, or cancelling interference in the signal caused by the detected pilot transmission.

22. The apparatus of claim 21, wherein the cell is a serving cell of the UE or a neighbor cell adjacent to the serving cell.

23. The apparatus of claim 21, wherein the pilot transmission is an S-CPICH transmission, and the pilot channel is an S-CPICH channel.

24. The apparatus of claim 21, wherein the at least one processor is further configured to use the detected pilot transmission to improve receiver processing comprising estimating a channel corresponding to the transmit antenna associated with the pilot transmission and using the estimated channel to improve the receiver processing.

25. The apparatus of claim 21, wherein the processor is further configured to detect the pilot comprising reducing a search space used to discover the pilot transmission to a hypothesis list of a first set of pilot channelization codes that is less than a second set of all possible pilot channelization codes.

26. The apparatus of claim 25, wherein the pilot transmission is an S-CPICH transmission, and wherein the processor is further configured to reduce the search space further comprising as least one of:
   removing known occupied orthogonal variable spreading factor (OVSF) codes, including OVSF codes used for primary CPICH or PCCPCH transmissions;
   limiting the first set to a first one or a first two spreading factor 16 codes of an OVSF code tree;
   identifying OVSF codes previously used for S-CPICH transmission in a serving cell of the UE or a neighbor cell adjacent to the serving cell; or
   discarding OVSF codes with larger than a threshold symbol gain estimate and/or signal-noise ratio (SNR).

27. The apparatus of claim 26, wherein the pilot transmission is an S-CPICH transmission, and wherein the at least one processor is further configured to detect the pilot transmission comprising:
  determining one or more symbol-based metrics based on symbol level estimates of hypothetical S-CPICH OVSF codes;
  comparing the one or more symbol-based metrics to a corresponding symbol metric threshold; and
  identifying the S-CPICH transmission based on the comparing.

28. The apparatus of claim 27, wherein the one or more symbol-based metrics comprise at least one of an average-based symbol metric, $a_i$, a norm squared-based symbol metric, $b_i$, or an average/norm squared ratio metric, $a_i/b_i$, and the processor is configured to identify the pilot transmission based on satisfying conditions of the algorithm including $a_i$ and $b_i$ both being greater than a first threshold and the ratio of $a_i$ and $b_i$ being above a second threshold.

29. The apparatus of claim 27, wherein the at least one processor is further configured to combine the symbol-based metrics over multiple estimation periods to improve the accuracy of detection and identifying the pilot transmission.

30. The apparatus of claim 21, wherein the pilot transmission is an S-CPICH transmission, and wherein the at least one processor is further configured to:
  determine one or more chip-based metrics based on chip level estimates of hypothetical S-CPICH OVSF codes;
  compare the one or more chip-based metrics to a corresponding chip metric threshold; and
  identify the S-CPICH transmission based on the comparing.

31. The apparatus of claim 30, wherein the one or more chip-based metrics comprise at least one of a peak energy-based chip metric, $p_i$, a total energy-based chip metric, $q_i$, a ratio metric, $p_i/q_i$, and wherein the processor is further configured to identify the S-CPICH transmission based on satisfying conditions of the algorithm including $p_i$ being greater than a first threshold and the ratio of $p_i$ and $q_i$ being above a second threshold.

32. The apparatus of claim 31, wherein the peak energy-based chip metric, $p_i$, and the total energy-based chip metric, $q_i$, are based on an estimated channel impulse response (CIR) for each S-CPICH hypothesis.

33. The apparatus of claim 30, wherein the at least one processor is further configured to combine the chip-based metrics over multiple estimation periods to improve the accuracy of detection and identifying the pilot transmission.

34. The apparatus of claim 21, wherein the pilot transmission is an S-CPICH transmission, and wherein the at least one processor is further configured to:
  determine a time correlation-based metric corresponding to channel impulse response (CIR) taps;
  compare the time correlation-based metric to a corresponding time correlation-based metric threshold; and
  identify the pilot transmission based on the comparing.

35. The apparatus of claim 34, wherein the at least one processor is further configured to combine the time correlation-based metrics over multiple estimation periods to improve the accuracy of detection and identifying the pilot transmission.

36. The apparatus of claim 21, wherein the at least one processor is further configured to:
  create a code management block to maintain a ranked list of pilot codes discovered across cells.

37. The apparatus of claim 36, wherein the at least one processor is further configured to:
  multiplex, based on the code management block, hardware and software resources needed for pilot code set discovery and management with other existing tasks using the hardware and software resources.

38. The apparatus of claim 36, wherein the at least one processor is further configured to:
  apply a hysteresis before adding or dropping a pilot code from the ranked list of pilot codes.

* * * * *